W. Sherrod.
Expanding Mandrel.
Nº 9,805. Patented Jun. 21, 1853.
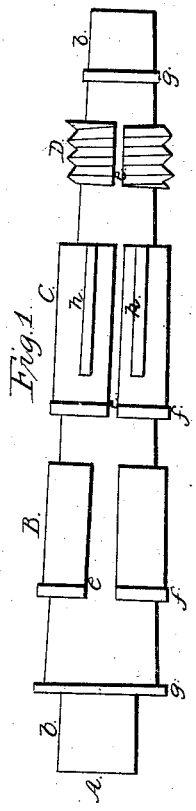
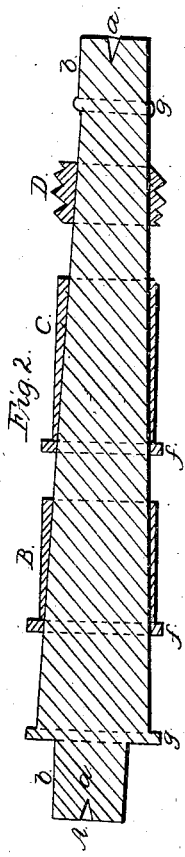
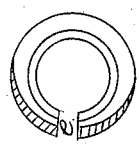
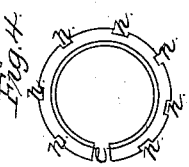
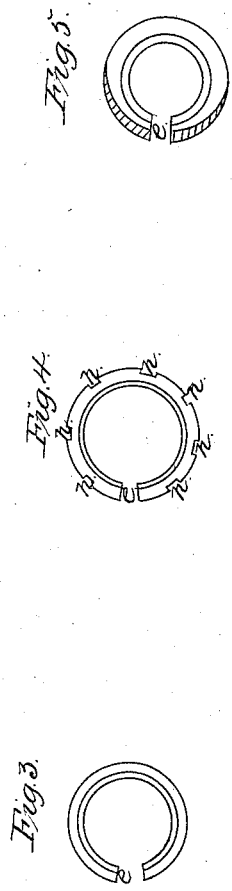

UNITED STATES PATENT OFFICE.

WALTER SHERROD, OF PROVIDENCE, RHODE ISLAND.

EXPANDING MANDREL FOR TURNING MACHINERY.

Specification of Letters Patent No. 9,805, dated June 21, 1853.

*To all whom it may concern:*

Be it known that I, WALTER SHERROD, of the city and county of Providence, State of Rhode Island, have invented a new and useful Expanding Mandrel for Lathe-Turning and other Purposes; and I do hereby declare that the following is a full, clear, and exact description of the same, reference being had to the accompanying drawings, forming part of this specification, in which—

Figure 1 is a longitudinal elevation. Fig. 2 is a longitudinal section. Figs. 3, 4 and 5 are detached end views of the expanding cylindrical spring shells B, C and D either of which when encircling A, constitutes a turning mandrel.

The same letters of reference denote similar parts in each of the several figures.

The nature of my invention consists in the use of an arbor having a taper turned thereon, on which is fitted an expanding cylindrical spring shell, cut open longitudinally with the arbor and held in its place by the friction of its elasticity.

To enable others skilled in the art to make and use my invention I will proceed to describe its construction and operation.

A, is a turning arbor with female centers *a, a,* at either end, it is flattened at both ends, so as to form the surfaces *b, b,* to procure a proper grip in the vise when fitting on; or taking off the work, or to apply the dog, or other driving arrangement when in use.

*g, g,* are collars or projections designed to limit the movement of the shell.

B, is a cylindrical spring shell drawn and welded with the aid of a mandrel of the same taper with the one upon which it is designed to be used it is then annealed and reamed with a reamer of the same taper its periphery is then turned off parallel or otherwise with its axis as may be desired forming the collar or projection *f*. The shell is then removed from the arbor and tempered before it is cut open (this is positively necessary to prevent its springing or warping) the cutting open as illustrated in Fig. 3 at *e* always being done at the joining whether welded or otherwise joined so as to insure a sound spring.

When a shell of great length is wanted it may be rendered more elastic than it otherwise would be by planing out grooves parallel with the surface of the arbor or at an angle that would cut the shell clear through part of the way of its length but in most cases as shown at *h* in Fig. 4, and *h* in the shell marked C.

The shell marked D, shows how to construct an expanding screw mandrel, which applies to all holes having a female thread cut therein, but the thread in many cases cannot be what is termed a full thread but can always be made deep enough to hold the shell from pushing through the hole when driving in the arbor A, which renders it equivalent to the collar *f* on B. This shell is made in the same way in every other respect as B and C. Fig. 5, also serves to explain this shell.

From this description of the construction it will be evident that the shell may be made to fit concentrically various diameters of holes as its position along the taper of the arbor is altered and a firm hold or friction produced on the work by simply driving in the taper mandrel the collar *f*, preventing the shell from driving through.

Many shells of different lengths may be used on the same arbor but it is not intended to allow more than one to occupy the arbor at a time. The workman will always select from the arbor box a shell a trifle shorter in length than the hole it is designed to fill by doing so "scoring" a very great evil in the present system of arbors will be avoided.

All kinds of turning in which a mandrel is required may be well done upon this mandrel by finishing the work complete all except a little beard or chip that will be left at the collar *f*, which can be removed by simply reversing the work on the mandrel.

Soft and hot pipes may be drawn to useful forms by the use of this mandrel. It will greatly aid in resisting the crushing action of dies when cutting screw threads on the outsides of their pipes.

It may take the place of the mandrels used at present in printers' rolls with great advantage; also grindstones and balance wheels may be firmly held in place by it.

The wear in carriage boxes and axles and many bearings in machinery may be taken up by the application of this principle with proper means of holding the shell in place. But the several purposes however to which my improved mandrel is applicable it is unnecessary to mention, as it is susceptible of many applications and if constructed as described it seems a plain fact that the many millions of pounds of steel and iron now employed for mandrel purposes might be otherwise employed, together with the saving of a vast amount of human toil.

What I claim as my invention and desire to secure by Letters Patent is—

A divided spring shell constructed in the manner described, when it is combined with a tapering mandrel so that by its own elasticity it shall retain its position on said mandrel, the whole arranged, constructed and combined in the manner herein set forth— not meaning to claim the combination of a tapering mandrel with a shell divided into more than one piece and tapering on its interior surface being held on said mandrel by a spring clasp.

WALTER SHERROD.

Witnesses:
HENRY MARTIN,
DAVID HEATON, 2d.